United States Patent
Krebs

(10) Patent No.: US 11,646,762 B2
(45) Date of Patent: May 9, 2023

(54) MASTER-SLAVE SYSTEM

(71) Applicant: Bayerische Motoren Werke Aktiengesellschaft, Munich (DE)

(72) Inventor: Alexander Krebs, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 58 days.

(21) Appl. No.: 17/055,623

(22) PCT Filed: Apr. 17, 2019

(86) PCT No.: PCT/DE2019/100356
§ 371 (c)(1),
(2) Date: Nov. 16, 2020

(87) PCT Pub. No.: WO2019/219115
PCT Pub. Date: Nov. 21, 2019

(65) Prior Publication Data
US 2021/0126670 A1    Apr. 29, 2021

(30) Foreign Application Priority Data

May 16, 2018   (DE) .......................... 102018207659.6

(51) Int. Cl.
*H04B 1/7163* (2011.01)
*H04B 1/713* (2011.01)

(52) U.S. Cl.
CPC ........... *H04B 1/7163* (2013.01); *H04B 1/713* (2013.01); *H04B 2201/71346* (2013.01)

(58) Field of Classification Search
CPC .................. H04B 1/7163; H04B 1/713; H04B 2201/71346; H04B 2201/694; H04W 72/08; H04W 84/18
See application file for complete search history.

(56) References Cited

U.S. PATENT DOCUMENTS

2005/0059345 A1    3/2005 Palin et al.
2009/0257396 A1   10/2009 Eliezer et al.
(Continued)

OTHER PUBLICATIONS

Golmie N., Rebala O. "Bluetooth adaptive techniques to mitigate interference" National Institute of Standards and Technology; Gaithersburg, Maryland 20899; Dec. 1, 2003; pp. 405-409.

*Primary Examiner* — Sam K Ahn
*Assistant Examiner* — Amneet Singh
(74) *Attorney, Agent, or Firm* — 2SPL Patent Attorneys PartG mbB; Kieran O'Leary

(57) ABSTRACT

A master-slave system for communication over an ultra-wideband radio connection is proposed. The master-slave system comprises at least one slave device and one master device, wherein the slave device and the master device are configured to communicate over the ultra-wideband radio connection. The master device is configured to generate and transmit a request message to the slave device over a first channel of the ultra-wideband radio connection. The slave device is configured to receive the request message over the first channel of the ultra-wideband radio connection, generate at least one response message based on the request message, and transmit the at least one response message to the master device over the first channel of the ultra-wideband radio connection, and the master device is configured to receive the at least one response message. Further, the master device is configured to classify the first channel of the ultra-wideband radio connection as suitable or unsuitable for data transmission based on the at least one received response message and to transmit further messages on the first channel of the ultra-wideband radio connection or to change to another channel of the ultra-wideband radio connection based on the classification.

8 Claims, 3 Drawing Sheets

(56) References Cited

U.S. PATENT DOCUMENTS

| | | |
|---|---|---|
| 2010/0046583 A1 | 2/2010 | So et al. |
| 2014/0369250 A1* | 12/2014 | Ren ........................ H04L 1/1854 370/312 |
| 2017/0280458 A1* | 9/2017 | Lou ........................ H04W 76/15 |
| 2019/0154439 A1* | 5/2019 | Binder ................. G01B 11/026 |

* cited by examiner

MASTER-SLAVE SYSTEM

CROSS-REFERENCE TO RELATED APPLICATIONS

This application is a 35 U.S.C. § 371(c) national stage entry of PCT/DE2019/100356, filed on Apr. 17, 2019. That application claimed priority to German Application 10 2018 207 659.6, filed on May 16, 2018. The contents of the earlier filed applications are incorporated by reference herein in their entirety.

FIELD

The invention relates to a master-slave system for communication over an ultra-wideband radio connection. Furthermore, the present invention relates to a motor vehicle, in particular a passenger car, which is a slave device or a master device for communication with a master device or a slave device in such a master-slave system.

BACKGROUND

An Ultra Wide Band (UWB) radio connection may be used as short-range radio communication, wherein large frequency ranges (3.1-10.6 GHz) may be used for data transmission. If several subscribers simultaneously use a physical resource (e.g. a frequency spectrum, a time slot or the like) of the ultra-wideband radio connection in a communications system, conflicts such as disturbances, packet collisions and interferences may occur. The current IEEE 802.15.4a standard defines both coordinated and uncoordinated approaches to resolve such conflicts. For example, synchronization by means of "Superframe Beaconing" may be used as a coordinated procedure and the CSMA technique and the ALOHA Random Access Protocol may be used for uncoordinated procedures.

However, synchronization using "Superframe Beaconing" is not suitable for use in the automotive sector in particular, as regulatory restrictions prohibit the transmission of such messages by motor vehicles in many countries. Other coordinated methods require a knowledge of the entire network topology at each subscriber, which is usually not possible to achieve due to the amount of necessary communication or at least involves a very high effort.

The uncoordinated procedures are associated with a high energy consumption due to the large number of messages required at the beginning of the communication and/or very high packet collision rates with several subscribers.

It is thus the object of the invention to enable communication between a slave device and a master device with a low probability of collision, while at the same time the required energy and computing resources may be reduced.

This object is solved by a master-slave system for communication via an ultra-wideband radio connection according to claim 1.

SUMMARY

The master-slave system comprises at least one slave device and one master device which are configured to communicate over the ultra-wideband radio connection. For this purpose, the slave device and the master device each comprise a communication unit.

To initiate communication over the ultra-wideband connection, the master device may first generate a request message and transmit it to the slave device across a first channel of the ultra-wideband radio connection. A channel of the ultra-wideband radio connection may be understood as a sub-frequency range of the entire frequency spectrum of the ultra-wideband radio connection. Alternatively, a channel may also be understood as a time slot of the ultra-wideband radio connection. Furthermore, it may also be a combination of frequency and time channel. The master device may also transmit the request message to more than one slave device if communication with several slave devices is to be performed. In this case, a different channel of the ultra-wideband radio connection is used as the first channel for each slave device.

The slave device may receive the request message over the first channel of the ultra-wideband radio connection, generate at least one response message based on the request message, and transmit the at least one response message to the master device over the first channel of the ultra-wideband radio connection.

The master device subsequently receives at least one response message. If the request message has been transmitted to more than one slave device, the master device may receive response messages from more than one slave device. In this case, the master device may perform the procedure described below for each slave device.

Based on the at least one response message received, the master device may classify the first channel of the ultra-wideband radio connection as suitable or unsuitable for data transmission. A data transmission may be understood as a transmission of messages with useful data as well as a runtime measurement.

Classification may be based on various criteria, which are explained in more detail below. Furthermore, the classification may be made in several stages, wherein the channel may be classified as unsuitable, acceptable or very suitable, for example. After classification, if the channel has been classified as suitable, the master device may transmit further messages on the first channel of the ultra-wideband radio connection or, if the channel has been classified as unsuitable, change to another channel of the ultra-wideband radio connection. Depending on the type of channel (frequency range and/or time slot), a change of channel means a change to another sub-frequency range and/or to another time slot.

In the latter case, the method may start again from the beginning with the other channel. Request and response messages may be exchanged until a channel has been classified as suitable and communication is carried out via this channel.

According to one embodiment, the master device is configured to classify the first channel of the ultra-wideband radio connection based on at least one characteristic of the at least one received response message. This classification and/or evaluation of the received response message may be based, for example, on the quality of the received response message(s). A signal-to-noise ratio (SNR) may be used for this purpose, which may directly indicate the signal quality of the channel.

Alternatively, a number of received response messages and/or a content of the response message may be used for classification. The number of received response messages may be used to determine, for example, how well a transmission is working and/or how many messages could not be received due to poor channel quality. A high number of received messages may thus lead to a classification of the channel as suitable, whereas a low number of received messages may lead to a classification of the channel as unsuitable. If the content of the response messages is used, it is possible, for example, to check whether the response messages are complete, e.g. by using a checksum.

Several threshold values may be used for classification. For example, the number of messages received may be used for classification into different quality levels. The master device may have different quality level requirements depending on the type of communication with the slave device. Even if the channel is classified into several quality levels, the master device makes a final decision as to whether the channel is suitable or unsuitable and, based on this, continues to transmit further messages and/or changes the channel. The decision may be made binary (i.e. yes or no, 1 or 0). Another possibility is to rate a medium and/or acceptable channel with 0.5 and/or to average the rating with the time history of the channel rating (moving average). If the averaged channel evaluation falls below a threshold value to be defined (e.g. 0.123) at a certain time, the channel may be changed in response.

In order to be able to start communication via the ultra-wideband radio connection, the master device and the slave device are configured in accordance with a further embodiment to exchange configuration information for communication via the ultra-wideband radio connection in advance via another radio connection, in particular a Bluetooth low-energy connection. This configuration information may be used to pre-select the first channel and/or at least one other channel of the ultra-wideband radio connection, both by the master device and also by the slave device. This ensures that the master device and the slave device use the same first channel and also change to the same channel when the channels are changed.

In one embodiment, the master device and the slave device are configured to select the first channel and/or at least one other channel of the ultra-wideband radio connection based on a common rule. Here, the master device and the slave device may determine the same channel as the first channel and/or other channel based on the configuration information and the same rule. Alternatively, the master device and the slave device may have predefined a sequence of channels for the first channel and the following additional channels in advance using the configuration information.

To inform the slave device on the classification and the further use of the first channel resulting therefrom, the master device may be configured to generate and transmit to the slave device a decision message on the classification and/or use of the first channel of the ultra-wideband radio connection based on the at least one response message and the classification. Subsequently, the slave device may transmit further messages on the first channel of the ultra-wideband radio connection or change to the other channel of the ultra-wideband radio connection based on the decision message.

The decision message may, for example, directly contain information about the classification of the channel as suitable or unsuitable. Alternatively, the decision message may not contain any direct information, but the slave device may interpret the reception of the decision message itself as information about the classification of the channel as suitable. If no decision message is transmitted and/or received, the slave device may interpret this as meaning that the channel has been classified as unsuitable.

In the event that the master device does not receive a response message or other message from the slave device for a predefined period of time, the master device may be configured to change to the other channel of the ultra-wideband radio connection. For example, if the channel quality is poor, the slave device may not have received a request message from the master device and therefore will not transmit a response message. By changing the channel after a predefined period of time, it may be ensured that the master device searches for another (better) channel if there is no transmission of messages from the slave device.

Such a channel change may also be performed on the side of the slave device. This may be the case, for example, if no request message is received by the master device after a predefined period of time after the ultra-wideband radio connection has been established and/or no decision message is received by the master device after a predefined period of time after the transmission of the at least one response message.

According to another aspect, a motor vehicle, in particular a passenger car, is proposed. The vehicle may represent either the slave device or the master device in a master-slave system as described above. The corresponding master or slave device for communication with the motor vehicle may be a mobile device, such as a smartphone, tablet PC or similar.

Furthermore, a method for communication between a slave device and a master device via an ultra-wideband radio connection is proposed. The method comprises the following steps:
Generating a request message and transmitting the request message from the master device to the slave device over a first channel of the ultra-wideband radio connection,
Receiving the request message from the slave device over the first channel of the ultra-wideband radio connection, generating at least one response message based on the request message, and transmitting the at least one response message from the slave device to the master device over the first channel of the ultra-wideband radio connection,
Receiving the at least one response message, classifying the first channel of the ultra-wideband radio connection as suitable or unsuitable for data transmission based on the at least one received response message and transmitting further messages from the master device to the slave device on the first channel of the ultra-wideband radio connection or to change to another channel of the ultra-wideband radio connection based on the classification.

The embodiments and features described for the proposed device apply accordingly to the proposed method.

Furthermore, a computer program product is proposed which comprises a program code which is configured to cause a computer to execute the method as described above.

A computer program product, such as a computer program means, may be provided or delivered, for example, as a storage medium, such as a memory card, USB stick, CD-ROM, DVD, or in the form of a downloadable file from a server in a network. For example, in a wireless communication network, this may be done by transmitting a corresponding file with the computer program product or computer program means.

Further possible implementations of the invention also include combinations of features or embodiments not explicitly mentioned before or in the following regarding the embodiments. The person skilled in the art will also add individual aspects as improvements or additions to the respective basic form of the invention.

Further advantages and advantageous embodiments are indicated in the description, drawings and claims. In particular, the combinations of the features indicated in the description and the drawings are purely exemplary, so that the features may also be present individually or in other combinations.

BRIEF DESCRIPTION OF THE FIGURES

In the following, the invention shall be described in more detail by means of embodiments shown in the drawings. Here, the embodiments and the combinations shown in the embodiments are purely exemplary and are not intended to define the scope of the invention. This is defined solely by the pending claims, in which:

In the following, identical or functionally equivalent elements are designated by the same reference numerals.

DETAILED DESCRIPTION

Figure 1:
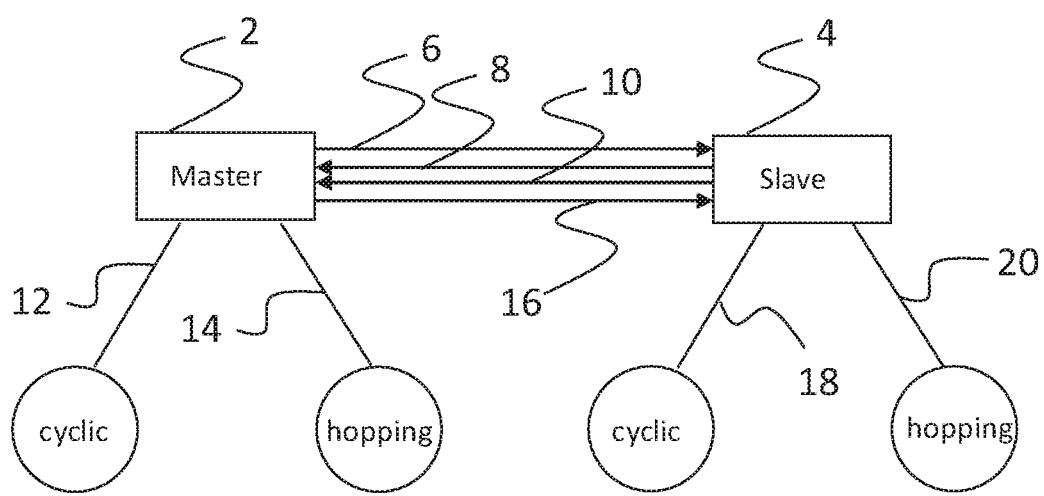
FIG. 1: shows a master-slave system for communication over an ultra-wideband radio connection.

FIG. 1 shows a master-slave system 1 for communication over an ultra-wideband radio connection (hereinafter UWB). The master-slave system 1 comprises a master device 2 and a slave device 4.

To communicate over the ultra-wideband radio connection, the master device 2 first sends a request message 6 to the slave device 4 over a first channel of the UWB connection.

The slave device 4 then sends one or more response messages 8, 10 based on the request message 6, also via the first channel of the UWB connection, to the master device 2. Based on the received response messages 8, 10, the latter may now make a decision and/or classification regarding the quality of the first channel of the UWB connection.

This classification may be based, for example, on how many response messages 8, 10 are received, what the signal-to-noise ratio is, or other characteristics that designate a transmission quality of the first channel. Furthermore, a combination of this information may also be used to classify the first channel as good or bad.

If the channel was classified as good 12, the master device 2 is in cyclic mode, i.e. it transmits further messages via this channel. If the channel was classified as bad 14, the master device changes to hopping mode and changes to another channel of the UWB connection. In both cases, the master device 2 may send a decision message 16 to the slave device 4, which contains, for example, a designation of the first channel as good or bad.

The slave device 4 may now also decide whether the channel is classified as good or bad.

If a decision message 16 was received and if this decision message 16 contains the classification of the channel as good, the slave device 4 may classify the channel as good 18 and is now also in cyclic mode, i.e. it transmits further messages via this channel. If no decision message 16 has been received within a certain period of time, or if a received decision message 16 contains the classification of the channel as bad, the slave device 4 classifies the channel as bad 20, therefore changes to hopping mode and changes to another channel of the UWB connection.

With this system 1, the decision on the signal quality of a channel may be made explicitly by the master device 2 by classifying the channel as good/suitable or bad/unsuitable for data transmission and transmitting a corresponding decision message 16 to the slave device 4. The slave device 4 may not actively classify the channel. However, the slave device 4 may force the master device 2 to change to another channel of the UWB connection by implicitly not transmitting the response message(s) 8, 10.

Figure 2:
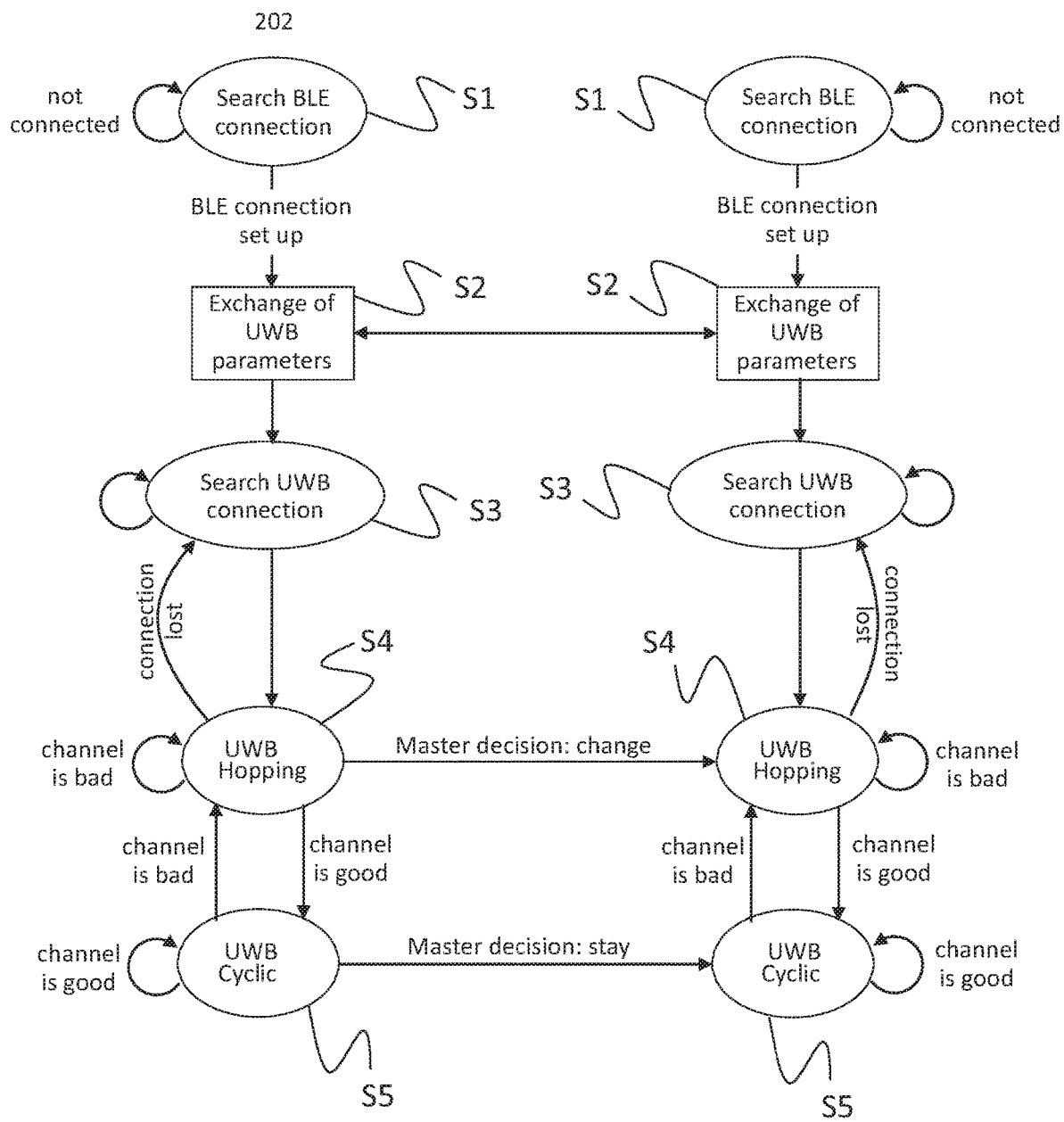
FIG. 2: shows a schematic flow chart for communication between a master device and a slave device of the master-slave system of FIG. 1.

FIG. 2 shows an exemplary flow chart for a communication between a master device 2 and a slave device 4.

In this example, communication is first established via a Bluetooth Low Energy Radio Interface (hereinafter BLE). The master device 2 detects in a first step S1 whether a BLE radio connection is present. This is done until a BLE connection is detected and established to the slave device 4. At the same time the slave device 4 in step S1 also detects whether a BLE radio connection is present and continues to do so until a BLE radio connection has been detected and established to the master device 2. The BLE radio connection may be established using a known method.

If the BLE radio connection has been established, the parameters and/or configuration information for the UWB communication are exchanged in a further step S2. The exchange here takes place via the BLE radio connection. The parameters and/or configuration information may specify, for example, how a UWB channel is selected.

After the exchange of the UWB parameters, in the next step S4 search for a UWB connection is performed. This search is carried out until a UWB connection is found.

Subsequently the master device 2 and the slave device 4 exchange messages as described in FIG. 1.

In steps S4 and S5 the master device 2 decides whether the currently used channel is to be classified as good or bad and informs the slave device 4 of this. Depending on the classification, both the master device 2 and the slave device 4 change between the hopping mode and the cyclic mode. The classification may also change during communication over the selected channel. In this case the master device 2 and the slave device 4 change back into hopping mode.

If the master device 2 and the slave device 4 have agreed that the channel is classified as a good channel, they remain on this channel for a certain period of time, which has been defined beforehand, in order to exchange data. If the channel has been classified as bad, the master device 2 and the slave device 4 hop to the next channel in hopping mode and classify the same again. Hopping from channel to channel is performed until a good channel is found.

If the UWB connection between master device 2 and slave device 4 is lost, both go back to step S3 and search again for a UWB connection. The method then continues at this point again with the search for a UWB channel and the evaluation of this channel.

Figure 3:
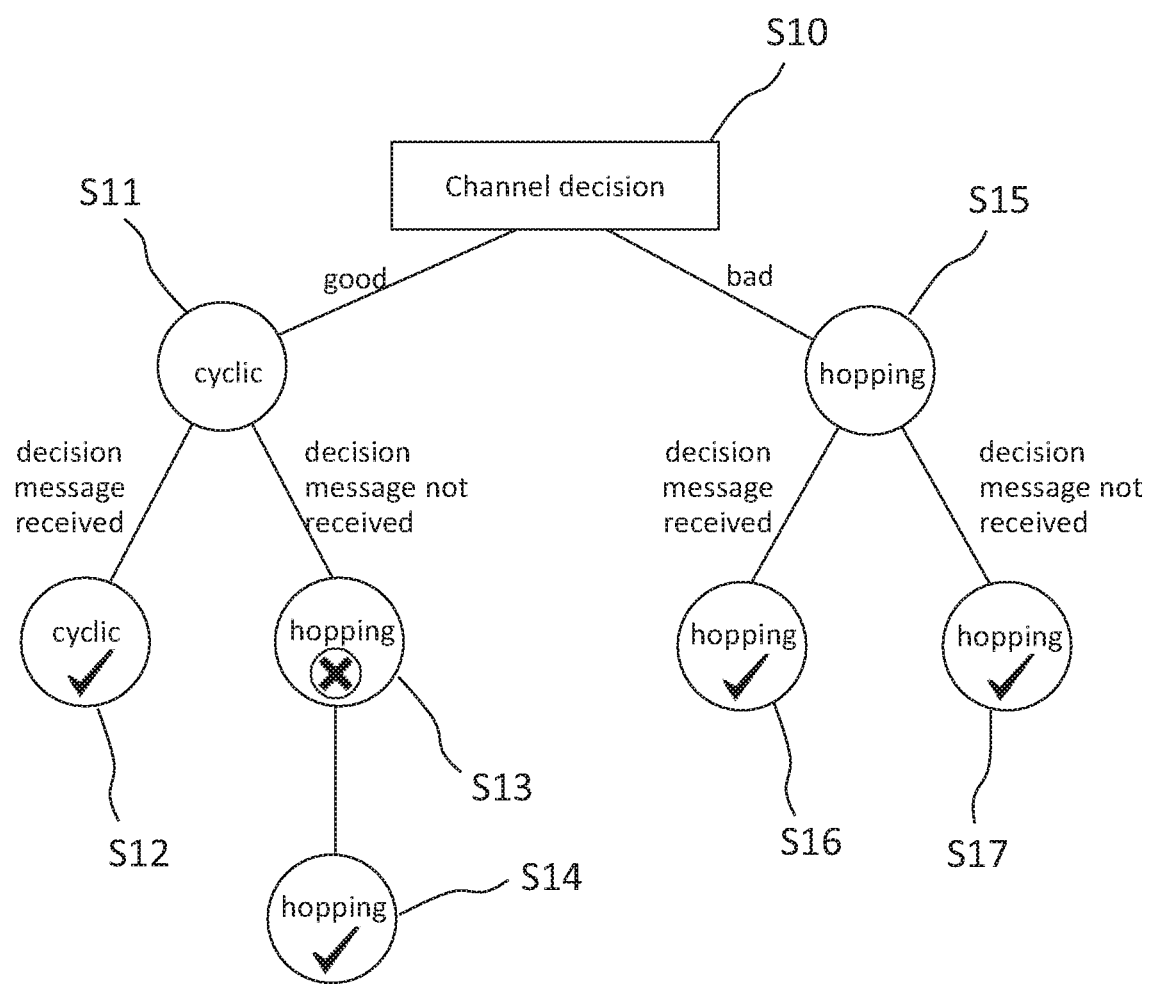
FIG. 3: shows a decision diagram for changing between channels in the master-slave system of FIG. 1.

FIG. 3 shows an example of a channel classification. In step S10 the channel is classified as good or bad by the master device 2. If it was rated good, in step S11 the master device 2 is in the cycle mode, as described above.

If the decision message 16 generated by the master device 2 is now received by the slave device 4 in step S12, the master device 2 and the slave device 4 are in cycle mode, i.e. they remain on the current channel and may communicate.

If the decision message 16 generated by the master device 2 is not received by the slave device 4 in step S13, the master device 2 is in cycle mode and the slave device 4 changes to hopping mode. A communication from the master device 2 with the slave device 4 will therefore lead to nowhere. Since the master device 2 now receives no messages from the slave device 4, the master device 2 will also jump back to hopping mode in the next step S14, as described above. Both devices 2, 4 are now again in the same mode and may agree again on the classification of a channel, since both devices are again communicating on the same channel. This is possible because the master device 2 and the slave device 4 have agreed in advance on a rule for selecting channels by exchanging configuration information and will therefore select the same channel for evaluation in hopping mode. In this way, the entire system 1 may always return to the stable state of the hopping mode.

If the channel was rated bad in step S10, the master device 2 is in the hopping mode in step S15, as described above. If the master device 2 sends a decision message 16 to the slave device 4, the same contains the information that the channel has been classified as bad. The slave device 4 will therefore, like the master device 2, remain in hopping mode, and both devices 2, 4 will jump to the next channel to classify the same.

If the slave device 4 does not receive a decision message 16 from the master device 2 in step S17, for example because it has been lost, the slave device 4 remains in the hopping mode. Since the master device 2 is also in hopping mode, devices 2, 4 change to the next channel and the classification starts again at step S10.

The described system 1 allows a simple selection of a UWB channel for a communication between a master device 2 and a slave device 4. Compared to known systems, no complex allocation of resources is necessary.

REFERENCE NUMERALS

1 Master-slave system
2 Master device
4 Slave device
6 Request message
8, 10 Response message
12, 14 Classification
16 Decision message
18, 20 Classification
S1-S15 Method steps
S10-S17 Method steps

The invention claimed is:
1. A master-slave system for communication over an ultra-wideband radio connection, comprising:
at least one slave device and one master device, wherein the slave device and the master device communicate over the ultra-wideband radio connection and a Bluetooth Low Energy connection,
wherein the master device and the slave device exchange configuration information in advance via the Bluetooth Low Energy connection, for communication via the ultra-wideband radio connection,
wherein the master device and the slave device each determine a first channel of the ultra-wideband radio connection and at least one other channel of the ultra-wideband radio connection based on the exchanged configuration information and a common rule for channel selection,
wherein the master device generates and transmits a request message to the slave device over the first channel of the ultra-wideband radio connection,
wherein the slave device is receives the request message over the first channel of the ultra-wideband radio connection, generate at least one response message based on the request message, and transmit the at least one response message to the master device over the first channel of the ultra-wideband radio connection, and
wherein the master device is configured to receive the at least one response message,
characterized in that:
the master device classifies the first channel of the ultra-wideband radio connection as suitable or unsuitable for data transmission based on at least one characteristic of the at least one received response message, wherein the at least one characteristic includes a signal-to-noise ratio of the at least one received response message,
and to transmit further messages on the first channel of the ultra-wideband radio connection or to change to the at least one other channel of the ultra-wideband radio connection based on the classification.

2. The master-slave system according to claim 1, wherein the master device classifies the first channel of the ultra-wideband radio connection based on a number of the received response messages.

3. The master-slave system according to claim 1, wherein the master device generates and transmits to the slave device a decision message on the classification of the first channel of the ultra-wideband radio connection based on the at least one response message and the classification.

4. The master-slave system according to claim 3, wherein the slave device transmits further messages on the first channel of the ultra-wideband radio connection or to change to the other channel of the ultra-wideband radio connection based on the decision message.

5. The master-slave system according to claim 1, wherein the master device changes to the at least one other channel of the ultra-wideband radio connection if no response message and/or further message is received from the slave device after a predefined period of time.

6. The master-slave system according to claim 1, wherein the slave device changes to the at least one other channel of the ultra-wideband radio connection if from the master device no request message is received after a predefined period of time after the ultra-wideband radio connection has been established and/or no decision message is received after a predefined period of time after transmission of the at least one response message.

7. A motor vehicle, in particular a passenger car, which is a slave device or a master device for communication with a master device or a slave device in a master-slave system according to claim 1.

8. The master-slave system according to claim 1, wherein the at least one characteristic further includes a completeness of the at least one received response message.

* * * * *